United States Patent
Mukai

[11] 3,814,496
[45] June 4, 1974

[54] BINOCULAR

[76] Inventor: Shin Mukai, 2-5-5 Goutokugi, Setagaya-ku, Tokyo, Japan

[22] Filed: Apr. 11, 1973

[21] Appl. No.: 349,980

[30] Foreign Application Priority Data
Apr. 15, 1972 Japan.............................. 47-37936

[52] U.S. Cl...................... 350/75, 350/36, 350/287
[51] Int. Cl. ............................................. G02b 7/12
[58] Field of Search .......... 350/75, 76, 36, 139, 287

[56] References Cited
UNITED STATES PATENTS
2,735,337   2/1956   Frischmann ...................... 350/75 X

*Primary Examiner*—David H. Rubin

[57] ABSTRACT

A binocular wherein one of the eyepiece tubes is designed to move horizontally without requiring relative movement of the objective lenses so as to enable the user to adjust the interval between the eyepieces to the interval of his own eyes. Such construction of the binocular allows to utilize a rectangularly shaped field stop which is suitable to the visual angle of a human being's eyes, whereby clear and wide view can be obtained.

2 Claims, 4 Drawing Figures

BINOCULAR

The present invention relates to a binocular the eyepieces of which are designed to be adjusted in accordance with the interval of the user's eyes without requiring relative movement of the objective lenses.

In the known binoculars wherein both bodytubes are connected with each other by means of a bridge member, manipulation of the eyepieces by the user to adjust them to the interval between his own eyes is carried out through rotating the bodytubes around the bridge member. Since the adjusting manipulation of the eyepieces is followed by the relative movement of the objective lenses, this type of binocular has drawbacks in that the range of view obtained thereby may become rich or poor according to the interval between the eyes of the user and that some difference in getting far-and-near view of the objects to be seen may badly be influenced.

It is an object of the present invention to provide a binocular in which the interval between the eyepieces is designed to vary without requiring relative movement of the objective lenses so that the drawbacks as described above in connection with the known binocular may be obviated. To achieve this object, the binocular according to the present invention is provided with a mechanism wherein at least one of the eyepieces is designed to move linearly with respect to the other so as to enable the user to adjust the interval between the eyepieces to his own eyes. With such linear movement of one of the eyepieces, a movable prism also installed within the binocular in a position between the objective lenses and the eyepieces is moved in such a manner that the optical axis thereof always corresponds with that of the eyepieces and the focus is always brought onto a singular plane.

The nature of the present invention will become more fully apparent from a consideration of the following description of an exemplary embodiment thereof, taken in conjunction with the accompanying drawings, in which.

Figure 1:
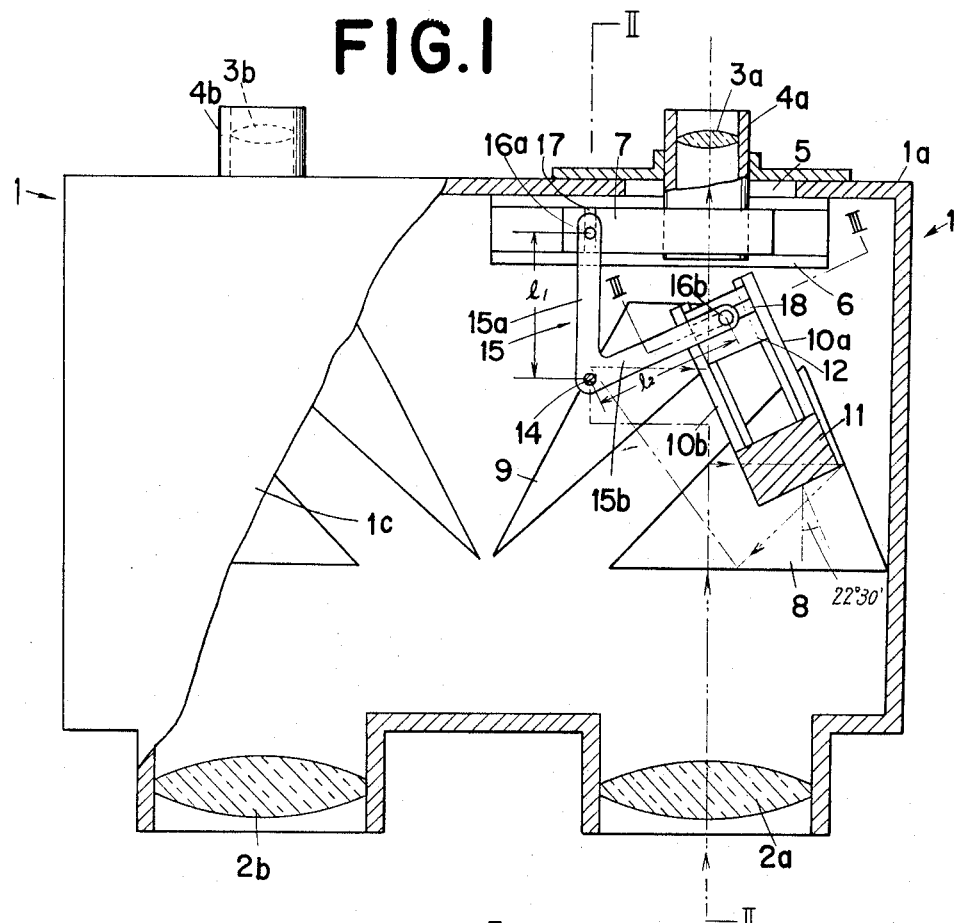
FIG. 1 is a front view, partially in section, of the binocular constructed according to the present invention.
Figure 2:
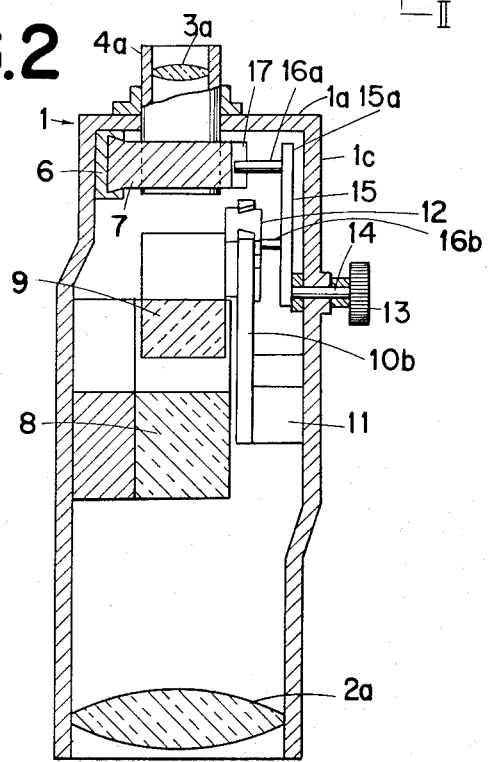
FIG. 2 is a longitudinal-sectional view taken along the line II—II of FIG. 1.
Figure 3:
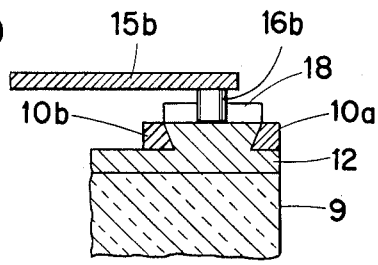
FIG. 3 is a section taken along the line III—III of FIG. 1.
Figure 4:
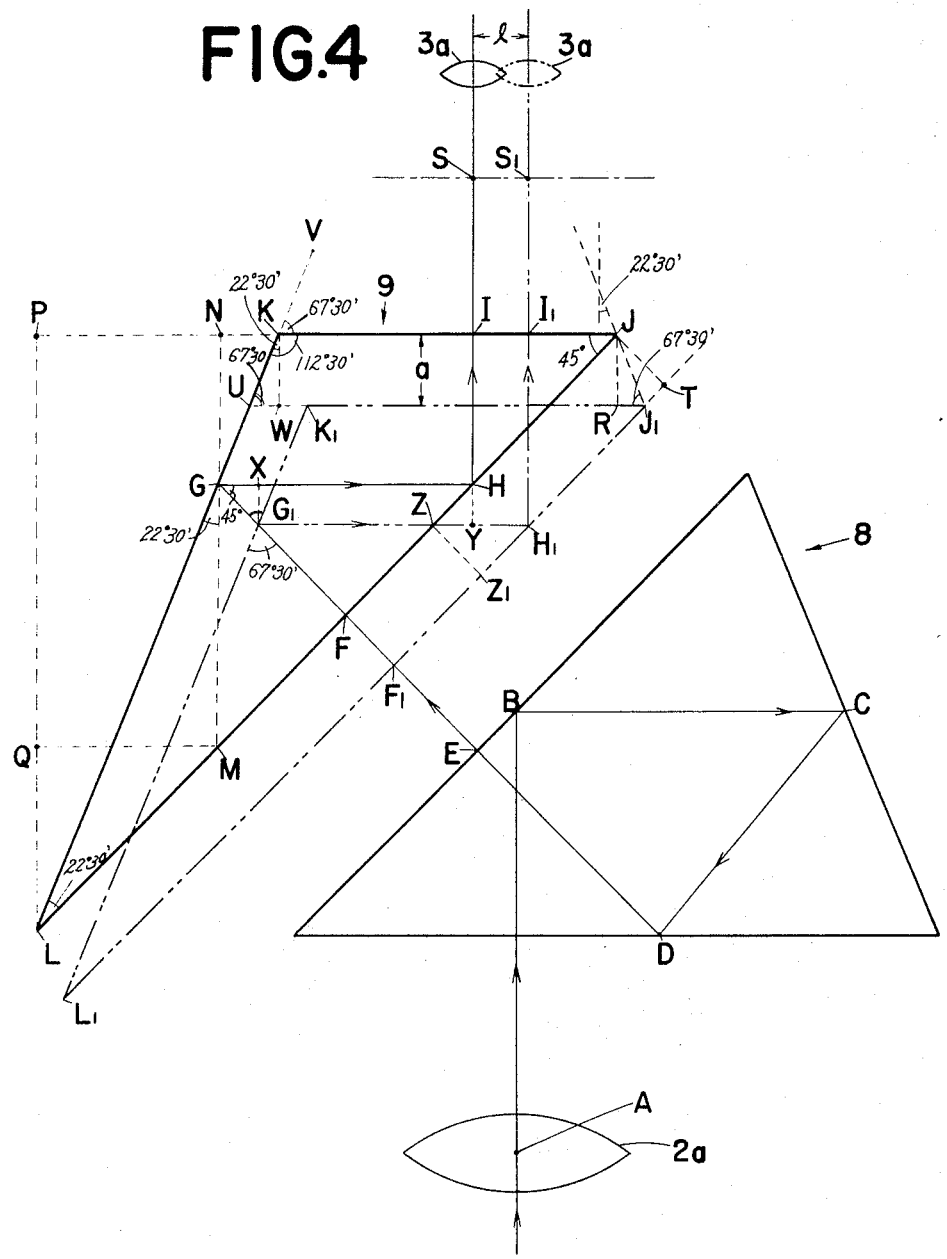
FIG. 4 is an explanatory diagram showing optical fundamentals.

In the drawings, reference numeral 1 designates generally a box-shaped body of the binocular according to the present invention. The lower portion of the body 1 is provided with a pair of objective lenses 2a, 2b and the upper portion with a pair of eyepiece tubes 4a, 4b into which eyepieces 3a, 3b are fixed respectively. The eyepiece tube 4a is made to pass through a slot 5 provided in the upper portion 1a of the body 1 and is connected to a slider 7 which is movable on either side by means of a guide 6 securely attached to the inside of the upper portion 1a of the body. Therefore, the eyepiece tube 4a is movable on either side.

In the light path entering from the objective lens 2a into the movable eyepiece 3a, there is installed a triangular stationary prism 8 and an inverse-triangularly shaped movable prism 9, the former being with vertical angle of 67° 30' and other two interior angles of the base 45°, 67° 30' respectively and the latter being with vertical angle of 22° 30' and other two interior angles of the upside 112° 30', 45° respectively.

The light passing through the objective lens 2a comes firstly at a right angle with respect to the base of the stationary prism 8, and is reflected rightwardly at the angle of 90° from the point B of the left oblique line to the point C of the right oblique line, reflected further from the point C to the point D of the base and finally allowed to enter into at a right angle the right oblique line of the movable prism 9 via the point E of the stationary prism 8. The light so entered into the movable prism 9 is then reflected rightwardly at the angle of 45° from the point G to the point H of the right oblique line, reflected further upwardly at the angle of 90° from the point H toward the center line of the eyepiece 3a via the point I of the upper line of the movable prism 9. The optical axis of the light reflected in this manner coincides with the center line of the eyepiece 3a.

The movable prism 9 is designed to move parallelly toward the direction of 22° 30' with respect to the optical axis of the eyepiece, which movement is brought about by the corresponding parallel movement of the movable eyepiece tube 4a. The amount of such movement of the movable prism 9 is defined in such a manner that as the movable eyepiece tube 4a is moved 1, so the movable prism 9 correspondingly moves 1.3 l.

The interlocking mechanism between the movable eyepiece tube 4a and the movable prism 9 will be explained as follows.

To the inside of a front plate 1c of the body 1, there is attached a base 11 which forms a part of two guide rails 10a, 10b and which is positioned at the angle of 22° 30' with respect to the optical axis of the eyepiece. To the lower side of the slider 12 the movement of which is brought about by the guiding movement of the rails 10a, 10b, there is attached the movable prism 9.

An adjusting shaft 14 having a grip 13 at its outer end is embraced by the front plate 1c of the body 1, the inner end of the adjusting shaft 14 being attached to a bent portion of a L-shaped lever 15. Free ends of the L-shaped lever 15, namely 15a and 15b are provided respectively with pins 16a, 16b which are received by the grooves 17, 18 respectively. These grooves 17, 18 are formed so as to extend at a right angle with respect to the sliding directions of the slider 7 for the eyepiece tube and the slider 12 for the movable prism. The length $l_1$, $l_2$ between the rotary shaft 14 and the free end 16a/16b is set in the ratio of 1:1.3.

As will be understood from the above explanation, it is possible through utilization of the binocular according to the present invention that the user suitably adjusts the interval between the eyepiece tubes 4a and 4b to the interval of his own eyes by moving the eyepiece tube 4a on either side through rotating the grip 13 at his will.

The movement of the movable eyepiece tube 4a is followed by the interlocking movement of the movable prism 9. In this connection, it is essential that the movement of the movable eyepiece tube 4a as well as the movement of the movable prism 9 is carried out in such a manner that the focus $S_1$ obtained after movement of the tube 4a and the prism 9 is always maintained on the same plane as that of the original focus S. It is also essential that the optical axis of the movable prism 9 after movement coincides with the optical axis of the movable eyepiece tube 4a. These essential factors can be satisfied by the use of the binocular according to the present invention, reasons for which will be explained hereinafter.

Based on the following reasons, the total length of the light penetrating through the movable prism is always maintained at a uniform length.

Since the movable prism 9 represents an isosceles triangle, $\triangle JIH$ thereof will be of $JI=JH$. Let the intersection of the vertical line passing through the second reflection point G and the extension KP of the upper line JK be N, IN will be given by the formula: $IN=GH$. Let the intersection of the vertical line passing through the second reflection point G and the right oblique line JL be M, the intersection of the same vertical line and the vertical line extending from the vertex L toward the extension line of the upper line be P, and the intersection of the same vertical line and the line extending downwardly at a right angle from the aforesaid intersection M be Q, respectively, $\triangle HGM$ will be a right-angled isosceles triangle and HG will be given by the formula: $HG=MG$. In the meantime, $\angle GLM = 22°\,30'$, $\angle MGL = 112°\,30' - 90° = 22°\,30'$ and $\triangle MGL$ is an isosceles triangle, therefore, MG will be given by the formula: $MG = ML$.

It is noted that $\triangle MQL = \triangle GMF$ ∵ $\angle MQL = \angle GFM = 90°$ $\angle MLQ = \triangle \ GMF = 45°$ $ML = MG$ ∴ $MQ = GF = PN$ Accordingly, $FG + GH + HI = PN + NI + IJ$ and the optical path length within the movable prism 9 will always be equal to that of JP.

If the amount of vertical movement a, obtained by the movement of the movable prism 9 is equal to the amount of movement $FF_1$ toward the incident optical axis with respect to the movable prism 9, the focus $S_1$ will be in the same plane of the focus S. For this purpose, the perpendicular directed downwardly from the point J of the movable prism (before movement) toward the upper line $J_1K_1$ of the movable prism (after movement) is designed to be equal to $FF_1$, the point of intersection of the said perpendicular and the upper line $J_1K_1$ being referred to hereinafter as R.

Assuming that the perpendicular is directed from the point J of the movable prism (before-movement) toward the extension of the right oblique line $J_1L_1$ of the movable prism (after-movement) and the intersection of the perpendicular and the extension is T, $\triangle JJ_1R$ will be in congruent with $\triangle JJ_1T$, both being right-angled triangles of the common oblique line $JJ_1$ and $\angle JJ_1R = \angle JJ_1T$ ∵ $\angle JJ_1R = 180° - 90 - 22°\,30' = 67°\,30'$ $\angle JJ_1T = 180° - \angle RJ_1H_1 - \angle JJ_1R = 180° - 45° - 67°\,30' = 67°\,30'$ It will therefore be understood that:

$$JT = JR \quad JT = FF_1$$
$$\therefore JR = FF_1$$

Accordingly, the focus $S_1$ will be in the same plane as the focus S.

Reference will now be made to the explanation on the reason that the radiant optical axis from the movable prism 9 coincides with the optical axis of the movable eyepiece 4a.

$\angle JJ_1K_1 = 67°\,30' = \angle KK_1U$ $\angle VKJ = 180° - \angle GKJ = 180° - 112°30' = 67°30' = \angle KK_1U$ $\triangle KUK_1$ is an isosceles triangle of $KU = KK_1$ and $\angle UKK_1 = 45°$ ∵ $\angle UKK_1 = \angle UKJ - \angle K_1KJ = 112°\,30' - 67°\,30' = 45°$ Assuming that the perpendicular is directed toward $UK_1$ from K and the intersection of the perpendicular and the line $UK_1$ is W, $\angle UKW = 22°\,30'$.

$$\therefore UW = a \tan 22°\,30' = a \times 0.4142$$
$$\therefore UK_1 = 2a \times 0.4142 = 0.8284a$$

It is noted that $\angle UK_1G_1 = 67°\,30'$ and $\angle L_1G_1F_1 = 67°\,30'$. Accordingly it will be understood that $$\angle GG_1K_1 = 67°\,30'$$

It is further noted that $K_1G_1 \parallel UG$ ∴ $UK_1 = GG_1 = 0.8284a$

Assuming that the perpendicular is drawn from $G_1$ toward the line GH and the intersection of the perpendicular and the line GH is X, the following formula will be obtained:

$$\angle XGG_1 = 180° - \angle KGX - \angle LGF = 180° - 67°30' - 67°\,30' = 45°$$

It will be seen, therefore, that $\triangle GXG_1$ is a right-angled isosceles triangle. Accordingly, $G_1X = GG_1 \sin 45° = GG_1 \times 0.7071$. Whilst it is noted that $GG_1 = 0.8284a$, from which the following formula will be obtained:

$$G_1X = 0.8284a \times 0.7071 = 0.5857a$$

Assuming that the perpendicular is drawn from the second reflection point H toward $H_1G_1$ and the intersection thereof is Y; the intersection of $H_1G_1$ and JL is Z; and the perpendicular is drawn from Z toward $J_1L_1$ and the intersection thereof is $Z_1$, it will be seen that $\triangle HZY$ is a right-angled isosceles triangle of $HY = YZ$ and that $GH \parallel G_1H_1$, from which the following formula will be obtained:

$$XG_1 = HY = YZ = 0.5857a$$

<sup>1</sup>
It is noted that $\angle ZH_1Z_1 = 45°$ and $\triangle ZZ_1H_1$ is a right-angled isosceles triangle, from the formulas: $H_1Z_1 = ZZ_1$, ∴ $ZH_1 = ZZ_1 \times 1/\cos 45°$ will be obtained. It is also noted that $ZZ_1 = a$, from which the following formula will be obtained:

$$ZH_1 = a/\cos 45° = a/0.7071$$

<sup>2</sup>
From these two formulas (1) and (2), the following formula will be obtained:

$$YH_1 = ZH_1 - ZY = a/0.7071 - 0.5857a = a\,(1/0.7071 - 0.5857) = 0.8285a$$

<sup>3</sup>
It is noted that $\triangle JRJ_1$ is of $JR = a$, $\angle J_1JR = 22°\,30'$ and $\cos 22°\,30' = 0.9238$, from which the following formula will be obtained:

$$JJ_1 = a/0.9238 = 1.08244a$$

<sup>4</sup>
From these two formulas (3) and (4), following formula will be obtained:

$$YH_1 : JJ_1 = 0.8285a : 1.08244a = 1 : 1.3064 \approx 1 : 1.3$$

Accordingly, the movement amount l of the movable eyepiece 3a will be equal to $YH_1$. Through maintaining the movement amount of the movable prism 9 with respect to the 22° 30' direction in a degree that such movement may be of 1.3l, it is possible to always adjust the radiant optical axis from the movable prism to the center axial line of the movable eyepiece. It will be understood that the binocular according to the present invention satisfies the conditions specified above.

The upward and downward visual angle of a human being's eyes is said to be narrower than the right and left visual angle; the former is of about 60° whilst the latter is of about 90°. It will be understood, therefore, that the field stop suitable to the visual angle of a human being's eyes will be the rectangularly shaped ones.

In the known binocular, adjustment of interval between the right and left eyepieces is carried out through rotating the body tubes around the bridge member provided therebetween. If the rectangularly shaped field stop as referred to above is adapted to use in connection with such known binocular, visual angle obtained thereby will very badly be influenced because the aspect ratio of the field stop is apt to incline during the interval-adjusting movement of the eyepieces.

According to the binocular of the present invention, utilization of the rectangularly-shaped field stop will not be followed by the inclination of the field stop during the interval-adjusting movement of the eyepieces, because such interval-adjusting movement of the eyepieces can simply be carried out by the manipulation of the eyepieces in either sides. The binocular according to the present invention is capable of providing the user thereof with clear and wide view through utilization of the rectangularly shaped field stop as well as the objective lenses which are suitable to the visual angle of a human being's eyes.

While the particular embodiment of the present invention has been shown and described, it will be obvious to those skilled in the art that changes and modifications may be made without departing from the invention in its broader aspects and, therefore, the aim in the appended claims is to cover all such changes and modifications as fall within the true spirit and scope of this invention.

What is claimed is:
1. A binocular comprising:
   a. a pair of stationary objective lenses and a pair of eyepieces one of which is designed to move on either side,
   b. a movable prism installed between the movable eyepiece and the opposite stationary objective lens in such a manner that it may move toward the direction of 22° 30' with respect to the optical axis of the movable eyepiece, the movable prism being inversetriangularly shaped so that the interior angles produced by two sides and the horizontal upper side which meets at right angles to the optical axis of the movable eyepiece are angled 112° 30' and 45° respectively,
   c. a stationary prism installed between the movable prism and the opposite objective lens so as to allow the light having passed through the objective lens to be directed at right angles to the 45° angled oblique side of the movable prism,
   d. a mechanism to obtain interlocking movement between the movable eyepiece and the movable prism, adapted to allow the movable eyepiece to move laterally and the movable prism to move in the direction of 22° 30' with respect to the optical axis of the movable eyepiece such that the ratio of movement amount therebetween be 1:1.3.

2. An interlocking mechanism between the movable eyepiece and the movable prism as set forth in claim 1, wherein the movable eyepiece tube into which the movable eyepiece is fixed is inserted into the box-shaped body of the binocular through a slot provided in the upper portion of the box-shaped body and is connected to a slider which is designed to be movable on either side by means of a guide, whilst the movable prism is connected to a slider which is designed to move the movable prism by means of a guide toward the direction of 22° 30' with respect to the optical axis of the movable eyepiece, each of the sliders being interlocked with each of the free ends of the L-shaped lever the bent portion of which is securely connected to the rotary shaft penetrating through the box-shaped body, the length between the axis of rotation of the L-shaped lever and the interlocking point at one of the free ends to be connected to the slider for use with the movable eyepiece tube and between the said axis of rotation and the interlocking point at other end of the free ends to be connected to the slider for use with the movable prism is in the ratio 1 : 1.3.

* * * * *